AUTOMATIC PNEUMATIC TUBE CARRIER

Filed April 13, 1960 2 Sheets-Sheet 1

INVENTORS.
G. TODT
W.R. BERNHARDT
BY Albert Reiss
ATTORNEY

Jan. 14, 1964 G. TODT ETAL 3,117,743

AUTOMATIC PNEUMATIC TUBE CARRIER

Filed April 13, 1960

2 Sheets-Sheet 2

INVENTORS.
G. TODT
W. R. BERNHARDT
BY [signature]
ATTORNEY

United States Patent Office 3,117,743

Patented Jan. 14, 1964

3,117,743

AUTOMATIC PNEUMATIC TUBE CARRIER

Gerhard Todt, Cliffside Park, N.J., and William R. Bernhardt, Long Island City, N.Y., assignors to Airmatic Systems Corporation, Rochelle Park, N.J., a corporation of Delaware Filed Apr. 13, 1960, Ser. No. 22,054
4 Claims. (Cl. 243—39)

This invention relates to pneumatic tube communication or conveyor systems and more especially it relates to such systems of the automatic or semi-automatic kind.

Pneumatic dispatch tube carrier systems of the automatic type utilize carriers which are sensed for distinctive marks indicative of their destination. At a suitable point along the pneumatic tube path a sensing chamber is located in which each carrier is scanned electrically while in a stationary position. In the sensing chamber, contact fingers sense the surface of the carriers. Such a system can be better appreciated from U.S. Patent 2,679,990, and more particularly from FIG. 10 thereof. The system of the reference patent utilizes carriers with a plurality of conductive rings axially spaced along the length of the body thereof. Thus, the carrier must be kept in a plane parallel to the plane of the contact fingers of the sensing chamber in order that each finger contact actually touches a particular conductive ring with which it is associated. Thus, both ends of the carrier must be of the same diameter in order to maintain the conductive ring surfaces in the plane parallel to the finger contacts. It follows, therefore, that the radius of a bend around which such a carrier may negotiate is limited by the length of the carrier, and the length thereof is dictated by the number of conductive rings disposed therealong.

A principal object of the invention is to provide novel contact control arrangements for a pneumatic conveyor system whereby the number of possible individual automatic selecting actions on the various traveling carriers can be greatly increased without using a correspondingly long carrier.

Another object is to provide an improved carrier for pneumatic tube conveyor systems, wherein a large number of control functions can be effected by the carrier by employing a matrix contact set located at one relatively localized region of the carrier, preferably adjacent one end thereof, and a selector switch or switches attached to the carrier at a convenient point thereon, whereby the contacts of said matrix set can be electrically "marked" in permuted combinations expeditiously, thus enabling each carrier to be selectively diverted to any one of a correspondingly large number of receiving points. This avoids the necessity of employing individually marked carriers with the marking permanently individualized with respect to each of the receiving points to which the carrier is to be sent.

Accordingly, it is a feature of this invention to provide a carrier with a series of sensing contacts arranged in spacial displacement around only part of the periphery of the carrier so that for any given peripheral band around the carrier a multiplicity of control functions can be achieved. Ancillary to this feature is the additional feature that a number of such peripherally spaced contacts can be located along the length of the carrier with a correspondingly great increase in the total number of possible control functions.

Another feature relates to a carrier for pneumatic tube systems, wherein all the function control contacts can be located on the carrier at one relatively short region along the length of the carrier. As a result it is not necessary that the carrier have the same overall or outside diameter at both the leading and trailing ends, which latter requirement is a necessary one in the conventional circularly cylindrical type of carrier. In other words, the carrier, according to the invention, by having its matrix contacts distributed as discrete elements around the periphery, can have those contacts confined substantially to one end region of the carrier. Consequently it is not necessary that the entire length of the carrier be parallel to the axis of the conveyor tubing during the sensing operation. As a result, the carrier, according to the invention, is capable of passing around sharper bends than has heretofore been possible with the conventionally circular carrier.

A further feature relates to a carrier of the kind which is elliptical or of partially flattened tubular cross section, and wherein one end of the carrier is provided with a contact matrix which can be located on a substantially flat part of the carrier periphery. Certain of these contacts of the matrix can be located on one end of the curved portions of the carrier to act as an ambiguity resolver, to determine whether the carrier has been inserted with the proper circumferential orientation at the entry point of the conveyor tube.

A still further feature relates to an improved carrier which can be provided with a replaceable contact matrix at one end and with a replaceable printed circuit unit and manually settable switches to mark the carrier with any one of a large number of selective sensing markings.

The above-mentioned and other features and objects of the invention and the manner of attaining them will become more apparent and the invention itself will be best understood by reference to the following description of an embodiment of the invention taken in conjunction with the accompanying drawings in which.

Since the pneumatic tube conveyor systems are well known in the art, it is not necessary herein to describe such a system in detail.

In some systems it may be necassary to have the carrier capable of selective diversion to as many as one hundred or more possible receiving points. We have found that instead of using circumferentially complete contact rings on the carrier spaced along the length thereof, a very large number of selective controls can be effected by providing the carrier with a matrix of contacts which are spaced around the periphery of the carrier and, if desired, in two or more rows along the carrier. In order to obtain the desired high number of selective functions, we have found that this contact arrangement is peculiarly useful when the carrier is made of a flattened tubular cross sectional shape. By using such shaped carrier, the matrix contacts can be attached or otherwise formed on a flat portion of the carrier periphery and by using a corresponding flattened tubular conveyor system, the carrier never rotates around its longitudinal axis.

Figures 1, 2:
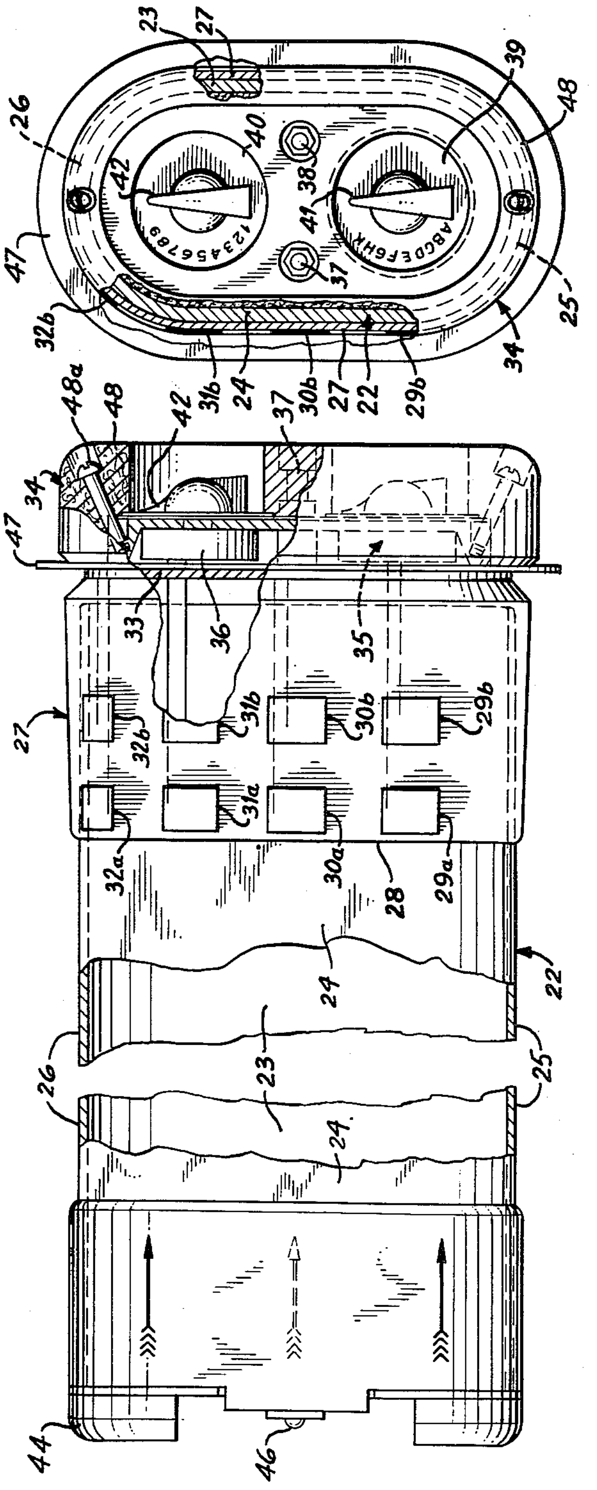
FIG. 1 is a longitudinal plan view of a carrier receptacle according to the invention.
FIG. 2 is a right-hand end view of FIG. 1.
Figures 3, 4:
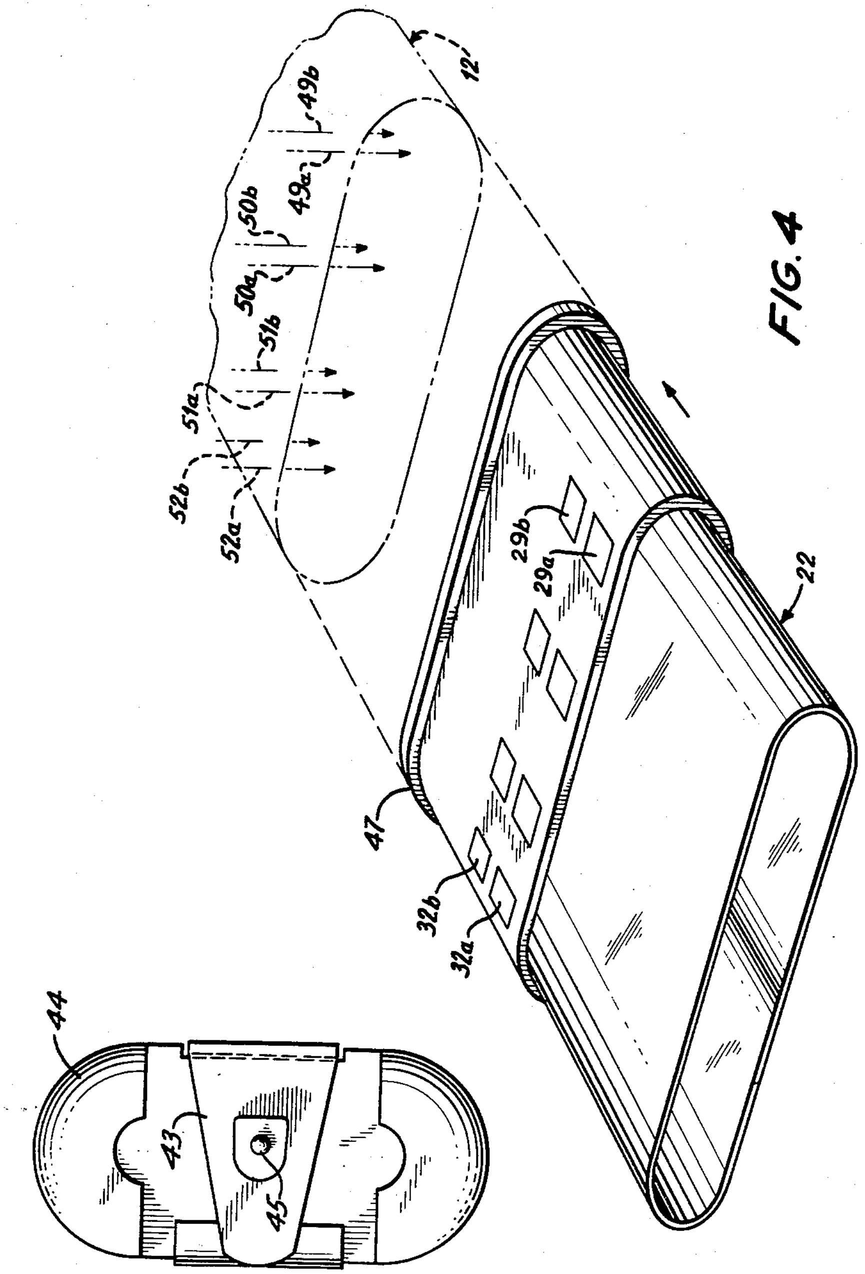
FIG. 3 is a left-hand end view of FIG. 1.
FIG. 4 is a schematic wiring diagram of the manually rotatable switches and their interconnection with the matrix contact set on the carrier.

Referring now to FIGS. 1 to 3, a carrier is shown embodying features of the invention and comprising a casing or main body portion 22 of clear plastic, leather, rubber, aluminum or any other suitable material. As indicated in FIG. 2, the casing 22 is of partially flattened tubular cross section having oppositely disposed flat faces 23, 24 and rounded sides 25, 26.

Tightly fitted over the forward end of casing 22 is a control head 27 which may be of plastic or other similar insulating material having a flattened tubular cross section corresponding substantially to casing 22. The flat face 28 of the contact head carries a plurality of elements *29a*, *29b*, *30a*, *30b*, *31a*, *31b*, *32a*, *32b* arranged in two parallel rows. While eight such contact elements are shown, it should be clearly understood that this number is not limitative and a greater or lesser number of them may be used without deviating from the spirit of the invention. These contact elements may be metal inserts molded into the top of face 23 or they may be in the form of platings on that face. Each contact element is connected by a suitable conductor to a corresponding terminal on the end plate 33. These terminals are interconnected by suitable conductors in various permuted combinations as known from the prior art represented, for instance, by U.S. Patent No. 2,667,314. For the purpose of selecting any particular combination, a pair of manually settable rotary selector switches 35, 36 is attached to a cupshaped member or selector head 34. The cupshaped member 34, carrying the switches, can be fastened to the control head 27 by suitable bolts 37, 38 and corresponding fastening nuts. Preferably, although not necessarily, the wiring on the plate 33 is done by any well known printed circuit technique. The switches 35 and 36 may be of the well known double rotary wafer kind, the wafers carrying appropriate contact segments which brush against corresponding stationary contacts, and cover an arrangement useful for destination switching to eighty destinations. Each of the switches 35, 36 is of the kind which can be moved from a normal or zero setting to any one of nine additional settings as indicated by the respective index plates 39, 40 and associated switch knobs 41, 42. In a manner well known in the pneumatic tube art, the contacts are scanned by sensing fingers and for each additional setting of the knobs 41 and 42, the plates *29a*, *29b* to *32a*, *32b* via the switch contacts and the sensing fingers can control a suitable switching mechanism in permuted combinations. Thus, by setting switches 39 and 40 to any one of their nine off-normal positions, the contacts *29a*, *29b* to *32a*, *32b* can afford as many as eighty different switching combinations.

It will also be observed that by locating certain of the contact elements, for example elements *32a*, *32b*, partly around the curved end 27 of the contact head, as indicated in FIGS. 2 and 6, it is possible to use this contact arrangement to resolve ambiguity as regards the insertion of the carrier in the tubing 12. In the ordinary circular type of carrier of the prior art, the selection is controlled by a series of continuous rings which completely surround the carrier and it is immaterial what axial orientation the carrier has when it is inserted into the tube 12. On the other hand, when partially flattened tubular carriers are used, such as those according to the invention, it is necessary that the carrier be inserted in one particular way in the corresponding partially flattened tube. Thus, by locating a pair of contact elements *32a*, *32b* on the curved side of this carrier they can be used to control a suitable relay switch arrangement which becomes released when the carrier is inserted in the proper relation into the tubing 12. On the other hand, if the carried is inserted 180 degree from the position shown in FIG. 6, the contacts *32a*, *32b* will not co-act with corresponding sensing fingers so that a different set of connections are made to control the switching apparatus as taught in said previously mentioned abandoned application.

The opposite end of the carrier from that having the contact head 28 is the insertion end for the material to be conveyed by means of the carrier and, as indicated in FIG. 1, that insertion end is provided with a closure having a swingable closure flap 43. The flap 43 may form part of a cover 44 of rubber, leather or the like, which is tightly fitted over the controlling end of the carrier and the flap 43 may be locked in place by any suitable snap fastener arrangement 45, 46. The cover 44 can be provided with suitable directional arrows *44a*, as shown to indicate the direction in which the carrier should be inserted in the conveyor tube. In order to move the carrier efficiently, the forward end is provided with a flexible washer 47 whose outer edge is greater than the contour of the cover 44 and fits the inside contour of the conveyor tubing. Likewise the usual felt head 48 can be fastened to the cup shaped member 34 by means of suitable recessed bolts or screws *48a*. From the foregoing it will be seen that by using only eight separate contact elements, they can be located closedly adjacent the forward end of the carrier and by using associated selector switches 35, 36 the said contact plates can be marked so as to distinguish from any one of the eighty different selections.

From the foregoing it will be seen that the contact head 27 with its respective contact elements and double rotary switch selector members can be made as a separate unit which can be replaceably attached to any carrier casing 22, thus providing more flexibility in the use of the carriers in accordance with the load to which the pneumatic system is being subjected.

By locating the matrix contacts closely adjacent the forward end of the carrier, even should the carrier pivot slightly about the felt head 34 at the sensing point, the location of the said contact sets close to the end of the carrier reduces the maximum amount of vertical displacement of the said contact elements with respect to the sensing elements *49a*–*52b*, thus providing a more reliable engagement between the contact sets and the sensing contacts at the sensing points.

It will be understood, of course, that the invention is not limited to the particular number of contact sets shown in the drawing as long as they are attached to the carrier and are arranged in circumferentially spaced and longitudinally spaced array in conjunction with suitable selector switches to energize them in the desired permuted combinations. Furthermore, while the drawing illustrates a sensing system of the electrical contacting kind, it will be understood that any other equivalent sensing arrangement may be used. For example, the contact elements *29a* to *32b* may be electrostatically sensed by corresponding electrostatic pick-up members corresponding to the sensing members *49a* to *52b*. Alternatively, the sensing may be done magnetically, in which event the elements *29a* to *32b* may be of magnetic material and the sensing elements *49a* to *52b* may be of the magnetic pick-up type.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. A replaceable function control head for attachment to a pneumatic carrier having a casing comprising two flat surfaces connected by curved portions, said head comprising a similarly shaped part having two flat faces connected by curved portions arranged to be telescoped over one end of said casing, a plurality of discrete contact sets on said head, at least one contact being located at a curved portion thereof and the remaining contacts being located on a flat face thereof.

2. A replaceable control head, according to claim 1, in which said contacts are arranged in at least one circumferential row.

3. A replaceable control head, according to claim 1, in which said contacts are arranged in rows and columns on the head and a pair of manually settable switches are also carried by said head, there being one such switch for each row of contacts, the switches being interconnected with said contacts to connect them in selectable coded combinations in accordance with the individual settings of said switches.

4. A carrier unit for pneumatic conveyor systems and the like comprising: a tubular casing for receiving subject matter to be transported; said casing having at least one flat peripheral face; and function control means to control the route of said carrier through a pneumatic tube comprising at least two rows of discrete spaced contacts fixed on said flat face; adjustable means to interconnect said contacts in predetermined coded combinations, and at least one of said contacts being located on a curved side of said carrier to indicate whether said contacts are properly oriented in the pneumatic tube.

References Cited in the file of this patent

UNITED STATES PATENTS

| | | |
|---|---|---|
| 1,965,933 | Taisey | July 10, 1934 |
| 2,043,293 | Jennings | June 9, 1936 |
| 2,288,427 | Anderson | June 30, 1942 |
| 2,353,870 | Blume | July 18, 1944 |

| | | |
|---|---|---|
| 2,667,314 | Goerlich | Jan. 26, 1954 |
| 2,815,182 | Mittag et al. | Dec. 3, 1957 |

FOREIGN PATENTS

| | | |
|---|---|---|
| 308,175 | Great Britain | Feb. 13, 1930 |
| 698,305 | France | Jan. 29, 1931 |
| 1,059,837 | Germany | June 18, 1959 |

OTHER REFERENCES

Engineering Progress Publication, pages 47 through 50, February 1935.